Figures 1, 2:
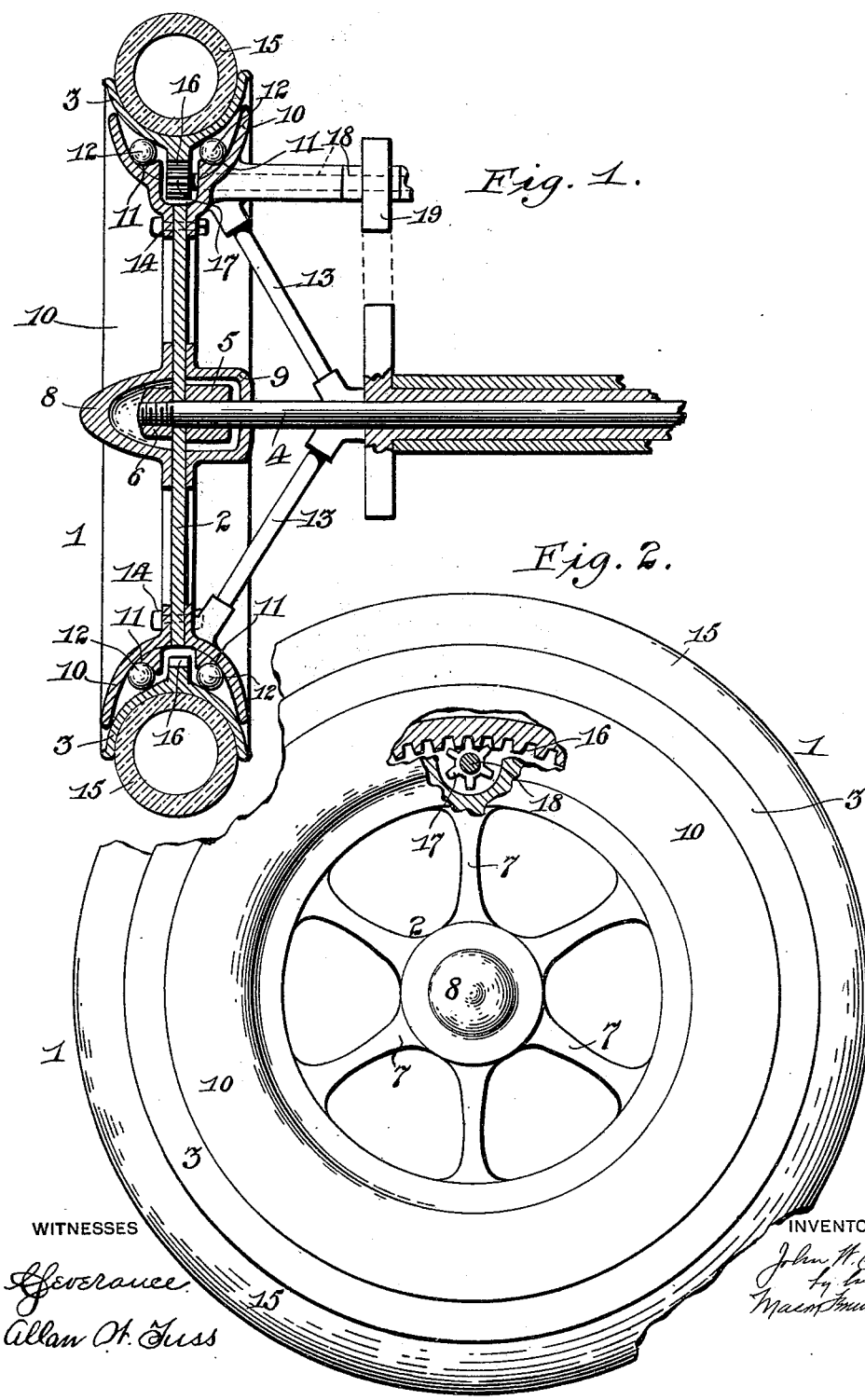

No. 636,900. Patented Nov. 14, 1899.
J. W. EISENHUTH.
WHEEL.
(Application filed Aug. 5, 1899.)

(No Model.)

WITNESSES
INVENTOR

UNITED STATES PATENT OFFICE.

JOHN W. EISENHUTH, OF NEW YORK, N. Y.

WHEEL.

SPECIFICATION forming part of Letters Patent No. 636,900, dated November 14, 1899.

Application filed August 5, 1899. Serial No. 726,301. (No model.)

*To all whom it may concern:*

Be it known that I, JOHN W. EISENHUTH, a citizen of the United States, residing at New York, in the county of New York and State of New York, have invented certain new and useful Improvements in Wheels; and I do hereby declare the following to be a full, clear, and exact description of the invention, such as will enable others skilled in the art to which it appertains to make and use the same.

My invention relates to improvements in wheels, and more particularly to wheels which are adapted for driving vehicles of any kind.

It consists in a wheel having a stationary central portion braced with respect to the vehicle and a rotating rim portion, ball-bearings interposed between the central portion and the rim portion, and gearing engaging the rim portion for rotating it, and thereby driving the vehicle.

It also consists in certain other novel constructions, combinations, and arrangements of parts, as will be hereinafter fully described and claimed.

In the accompanying drawings, Figure 1 represents a vertical transverse section through a wheel constructed in accordance with my invention; and Fig. 2 represents a side elevation of the same, parts being broken away to show the gearing.

1 in the drawings represents a wheel, 2 a central stationary portion, and 3 a rotating rim portion.

My improved wheel is designed to supply vehicles with a driving means which shall not be subjected to binding strains, so as to make the parts run with friction. It is designed to supply a wheel which will be well braced with respect to the frame of a vehicle, so that the gearing used to impart motion to it will not be liable to twisting or to being otherwise thrown out of true.

The wheel 1 is formed with its central portion 2 secured rigidly to the frame of the vehicle. As seen in the drawings, the stationary portion 2 is secured to the end of a fixed axle, as 4, being firmly secured thereto by means of a hub 5 and a nut 6. The stationary portion 2 may be formed of a solid disk or may be provided with radiating spokes, as 7 7. (Seen in Fig. 2.) Finishing-caps, as 8 and 9, may be added to the hub portion in order to give a neat and artistic appearance to the parts. The central portion 2 of the wheel carries upon its periphery a grooved bearing portion, as 10, the outer periphery of the said bearing portion being provided with two ball-races, as at 11 11, suitable bearing-faces being supplied to receive antifriction-balls, as 12 12. The rim 10 is thoroughly braced with respect to the frame of the vehicle by means of diagonal or inclined brace-rods, as 13 13, so that the said rim portion is firmly and rigidly held in place. The outer portion of the rim 10 is preferably made removable and secured to the stationary portion 2 by means of bolts or rivets, as 14 14, so that the parts may be easily removed. The rotating rim 3 is formed so as to travel in the stationary rim 10, the said rim being preferably hollow and provided with a suitable tire, as 15, of any well-known kind. The inner surface of the rim 3 is made with suitable bearing-faces to engage the balls 12 and run thereon. In order to actuate the movable rim 3, it is provided upon its inner periphery with gear-teeth, as at 16 16, which are adapted to engage an actuating-pinion, as 17, secured to a drive-shaft 18. The drive-shaft 18 finds bearing in the frame of the stationary portion, its outer end extending into the stationary rim 10, at which point the pinion 17 is mounted interiorly of the said rim portion, so as to mesh with the gear-teeth 16. A gear or other pulley, as 19, may be secured to the drive-shaft 18 and may receive its motion from any suitable motor carried upon the vehicle for propelling the same.

It will be noted from the above description that I have constructed a simple and yet desirable wheel and one that is capable of being constructed so as to be thoroughly braced with respect to the vehicle to which it is attached. The driving-shaft also receives a bearing in the rigid part of the frame and wheel and engages the actuating-rim in such a way that there is no chance for a binding strain between the parts or a twisting of the gear, so as to make their teeth bind. The ball-bearings facilitate the movement of the wheel without friction.

Having now described my invention, what I claim as new, and desire to secure by Letters Patent, is—

1. In a wheel, the combination with a stationary central portion, of a revoluble rim portion, a gearing attached to the revoluble rim portion for moving the same, antifriction-bearings interposed between the stationary portion and the rim portion and arranged upon each side of the gearing, the said antifriction-bearings coming into direct contact with the said rim upon its inner surface, the structure being such that there will be no binding or twisting action between the parts in revolving the wheel, substantially as described.

2. In a wheel for vehicles, the combination of a central portion mounted rigidly upon the frame of a vehicle and provided with a peripheral groove, a revoluble rim adapted to move upon the rigid portion, the said revoluble rim having a tire upon its outer periphery, gear-teeth arranged centrally upon the inner periphery of the said rim, antifriction-bearings mounted in the said peripheral groove and arranged upon each side of the gear-teeth on the revoluble rim, a gearing mounted upon the rigid portion for actuating the gear-teeth on the revoluble rim, substantially as described.

3. A wheel for vehicles comprising a central stationary portion secured to the frame of a vehicle, means for bracing the said central portion, a revoluble rim entirely disconnected from the stationary portion, an internal centrally-arranged gear formed upon the revoluble rim, ball-races formed in the stationary central portion, antifriction-balls mounted in the said frame and arranged upon each side of the internal gear upon the revoluble rim, a shaft mounted upon the stationary portion of the wheel and extending into the hollow rim portion, and a pinion secured to the said shaft and engaging the internal gear for revolving the outer rim of the wheel and driving the vehicle forward, substantially as described.

4. In a wheel for vehicles, the combination of a central stationary portion having a hub for engaging the axle of the vehicle, a nut for holding the same in place, finishing-caps applied over the said nut and hub, rods for bracing the rim of the said central portion, ball-bearings mounted in the rim of the same, a revoluble rim portion engaging the said ball-bearings directly, the said rim portion being hollow and provided with a suitable tire, an internal centrally-arranged gear formed upon the revolving rim portion and a pinion for actuating the same, the construction being such that the wheel may be rotated so as to drive the vehicle without any chance of binding in the parts, substantially as described.

In testimony whereof I hereunto affix my signature in presence of two witnesses.

JOHN W. EISENHUTH.

Witnesses:
JOHN A. HILTON,
CHARLES H. GRAHAM.